(12) United States Patent
Smith et al.

(10) Patent No.: US 6,195,000 B1
(45) Date of Patent: Feb. 27, 2001

(54) EMERGENCY AUTO VISUAL COMMUNICATION SYSTEM

(76) Inventors: Jack V. Smith; Jesse M. Carter, both of P.O. Box 3363, Seminole, FL (US) 34642

( * ) Notice: Subject to any disclaimer, the term of this patent is extended or adjusted under 35 U.S.C. 154(b) by 0 days.

(21) Appl. No.: 08/019,666

(22) Filed: Feb. 19, 1993

(51) Int. Cl.[7] .................................................. B60Q 1/52
(52) U.S. Cl. ...................................... 340/471; 340/425.5
(58) Field of Search .................... 340/425.5, 471, 340/461, 469, 525, 712, 702, 703, 793, 815.07, 815.17, 473

(56) References Cited

U.S. PATENT DOCUMENTS

| | | | |
|---|---|---|---|
| 3,750,138 | * 7/1973 | Burgan et al. | 340/479 |
| 4,361,828 | * 11/1982 | Hose | 340/422 |
| 4,574,269 | * 3/1986 | Miller | 340/479 |
| 4,631,516 | * 12/1986 | Clinker | 340/464 |
| 4,728,936 | * 3/1988 | Guscott et al. | 340/525 |
| 4,752,771 | * 6/1988 | Katogi et al. | 340/762 |
| 4,868,542 | * 9/1989 | Thompson | 340/468 |
| 4,928,084 | * 5/1990 | Reiser | 340/469 |
| 4,949,071 | * 8/1990 | Hutchison | 340/468 |
| 4,974,354 | * 12/1990 | Hembrook, Jr. | 40/546 |
| 5,053,746 | * 10/1991 | Taneo | 340/473 |
| 5,132,666 | * 7/1992 | Fahs | 340/472 |
| 5,426,414 | * 6/1995 | Flatin et al. | 340/472 |
| 5,825,281 | * 10/1998 | McCreary | 340/425.5 |
| 5,905,434 | * 5/1999 | Steffan et al. | 340/464 |

* cited by examiner

*Primary Examiner*—Nina Tong
(74) *Attorney, Agent, or Firm*—Larson & Larson, P.A.; James E. Larson

(57) ABSTRACT

There is herein described an emergency auto visual communication system that will enhance roadway, vehicular, and individual safety. Whereby the stranded motorist, accident victim, medical emergency, etc. is provided a viable means for communication of the situation to a casual observer, proper authorities, or other parties of interest accurately, precisely, and rapidly without having to leave the safety and confines of the vehicle. That is, the invention provides an advantageous means to prevent loss of life, save precious seconds, and provide the individual in need the proper help by use of the luminated electronic message board attached to the rear window of a vehicle controlled by a alpha-numeric computer keyboard.

1 Claim, 5 Drawing Sheets

EMERGENCY AUTO VISUAL COMMUNICATION SYSTEM

BACKGROUND OF THE INVENTION

In todays environment of increasing roadway hazards such as, more and larger vehicles, crime, drug abuse, among others, the need for a system of communication from vehicle to vehicle without the use of radios or phones is imminent. It is apparent that a system that allows for accurate information to be passed from an individual in an emergency situation to the observer passing by without the aid of the afore mentioned devices is an advancement in the art of highway and vehicular safety.

According to the National Safety Council (NSC) 43,500 motor-vehicle deaths and 1,600,000 disabling injuries occurred in 1991. The cost of the accidents in 1991 was 96.1 billion dollars. A death occurs on the highways once every 12 minutes and an injury occurs every 20 seconds. Out of the 43,500 vehicular deaths in 1991, 7,000 included deaths of persons struck by motor vehicles either on or off a street or highway. The total number of accidents between a vehicle in motion and a pedestrian in 1991 was 220,000. The percentage of deaths due to motor vehicles and pedestrians rises sharply at night to more than three times that during the day. This further illustrates a need for a device that would allow a user to communicate with oncoming traffic without having to leave the confines of the vehicle, especially during the night. This would also markedly advance the art of highway safety.

1. National Safety Council. (1992). Accident Facts, 1992 Edition. Itasca, IL:Author.

The ability of an individual requiring roadside assistance to convey a message to someone in another vehicle or possibly a building, etc. is the first step to resolution of a situation. By use of the emergency auto visual communication system (EVAC) an individual is afforded a way of quickly communicating the situation accurately, concisely and rapidly. The EVAC is an obvious improvement in the ability of an individual to communicate in a possible life threatening situation which in turn is an improvement in the art of highway safety.

The increased safety factor of the individual with an EVAC installed in their car also extends to the casual observer passing by. For instance, if a vehicle is stalled o a medical emergency has arisen, accurate information can be transmitted visually via the EVAC to the observer (i.e. Please Call 911, CALL A DOCTOR THE INJURY IS . . . . . . , CALL MY MOM 800-HEL-PMOM, HAVE BEEN ROBBED, etc.). This allows for the observer to come to the aid of an individual without coming in physical contact with the individual requiring aid. The result being, that both parties are kept apart incase of foul play, legalities, etc. Not only is it important to give aid to the stranded motorist, but to give the proper aid whether it be police, medical, or mechanical. Another advancement in the art of highway and individual safety is the EVAC's ability to effectively communicate while the vehicle is moving. An example may include: 1) A vehicle speeding to the hospital carrying someone in a medical emergency (heart attack . . . . ) using EVAC to inform police of the situation without having to stop (thereby saving time). This of course also comes to aid in other cases of medical emergencies, robberies, etc. The EVAC has the ability to have a set of messages stored in the computer for ready access that can be instantly displayed on the message board. It can be noted that any message whether it be alpha-numeric or graphic can be displayed.

In accordance with the present invention, an improved means of emergency auto visual communication is provided that will enhance roadway, vehicular, and individual safety. This invention provides the stranded motorist, accident victim, o medical emergency victim, with a viable means for communication of the situation to the casual observer, police, fire, emergency medical personnel and others accurately, precisely, and rapidly. That is, the invention provides an advantageous means to the prevention of accidental death and damage to property. This invention can also mitigate the effects of other medical emergency and mechanical breakdowns and thus constitutes a significant advancement in highway, vehicular, and individual safety.

SUMMARY OF THE INVENTION

In view of the foregoing facts, it is a primary object of the present invention to provide a system of communication from vehicle to vehicle without the use of radios or phones. It is also apparent that a system allows for accurate information to be passed from an individual in an emergency situation or in need of general assistance to the observer passing by without the aid of the aforementioned devices is an advancement in the art of highway, vehicular, and individual safety.

Another object of the present invention is to provide a means for an individual to communicate with an observer by use of a visual aid (luminated electronic display message board) that can be seen easily from various distances.

Still another object of the present invention is to provide a means of communication in the form of a visual display board that can convey messages by alpha-numeric or graphical means from one vehicle to another vehicle or person.

Yet another object of the present invention is to provide a means of communication in times of daylight or darkness.

A primary object of the present invention is to provide a means of communication that would enable an individual the ability to communicate with others without leaving the confines of the vehicle. The later being an obvious advantage to a stranded motorist unable to escape from a vehicle.

Again another object of the present invention is to provide a unique vehicular communication device that allows the person inside the vehicle, containing said device to send a message to a person who is nearby on foot or in another vehicle (while the vehicle is in motion or stationary).

Additionally, another object of this invention is to provide a relatively simple means of communication that can be used in various situations. The device has the ability to store multiple sets of messages as well as the ability to instantly deliver new spontaneous compositions as the particular situation demands. This unique ability to call up "canned" messages or create an appropriate one quickly affords the person rapid response in stress or times of need situations.

Another object of the present invention allows the visual message to be entered on the keyboard of a computer with the use of one or both hands.

Continually another object of the present invention is to provide a visual communication system that can be displayed on the rear window of a vehicle, on the side windows of a vehicle or any other part of the vehicle that allows attachment of the message board.

In accordance with an embodiment of the present invention, an emergency auto visual communication system which provides the stranded motorist or accident victim, or others, with a method of communication that includes a direct current (DC) to alternating current (AC) power converter that is inserted into the vehicle's cigarette lighter slot or wired directly to the battery of the vehicle. This converter in turn is connected to a computer with keyboard that controls a display board which attaches to the rear window or other part of the vehicle. Yet, the said device can be powered by AC, DC, or battery power directly. The power supply for this device be any of the previously mentioned sources or a combination thereof. A message can be displayed on the LED board and seen through the car window.

A message is entered via the computer keyboard and sent to the ruminated electronic display (LED) that is attached to the rear window via suction cups or other method. The message displayed on the LED display is clearly visible in day, or night time.

The features of the present invention, which are believed to be novel are set forth with particularity in the appended claims. The present invention, both as to its organization and manner of operation and use, together with further objects and advantages thereof, may best be understood by making reference to the following description. The description mistaken in conjunction with the accompanying drawings in which like reference characters refer to like elements in the several views.

DESCRIPTION OF THE PREFERRED EMBODIMENT

Figure 1:
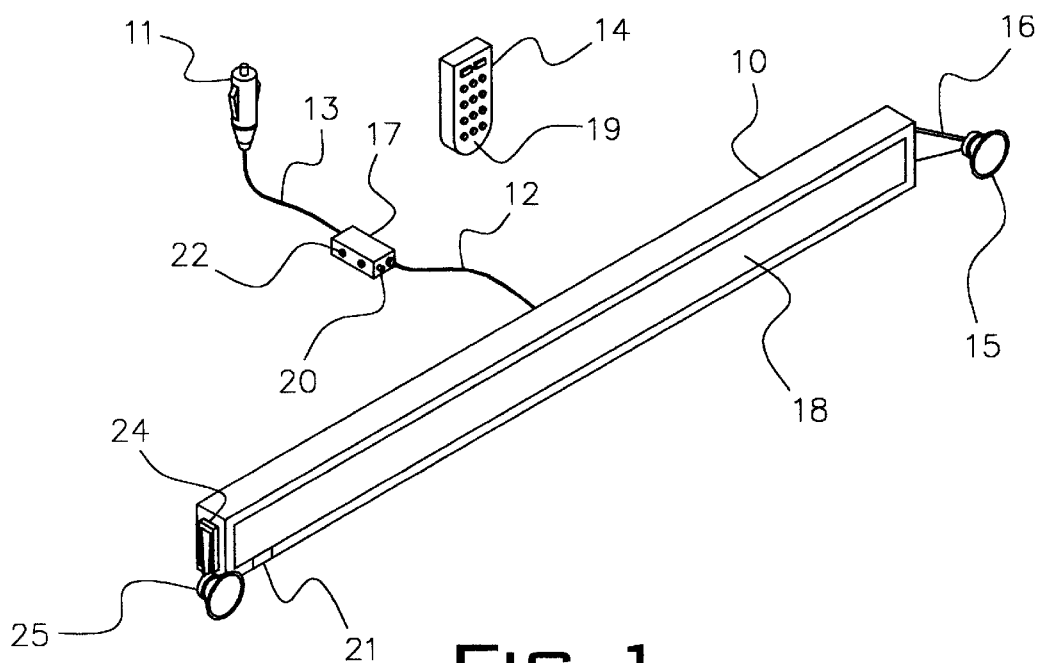
FIG. 1 is a perspective view of the emergency auto visual communication system according to the invention.
Figure 2:
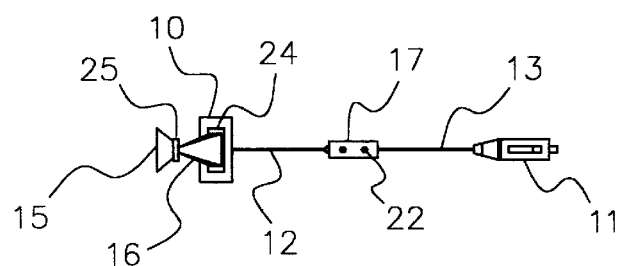
FIG. 2 is a side elevational view of the emergency auto visual communication system of FIG. 1.
Figure 3:
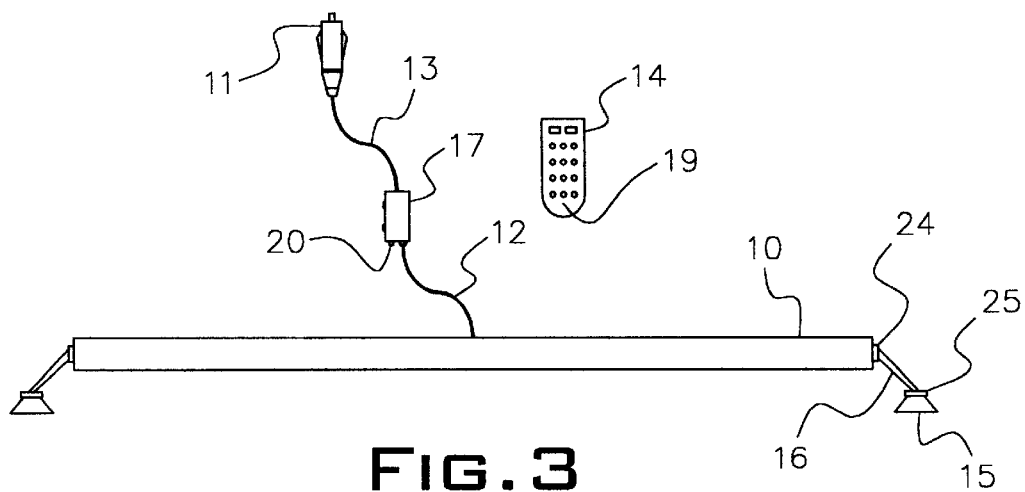
FIG. 3 is a top plan view of the emergency auto visual communication system of FIG. 1.
Figure 4:
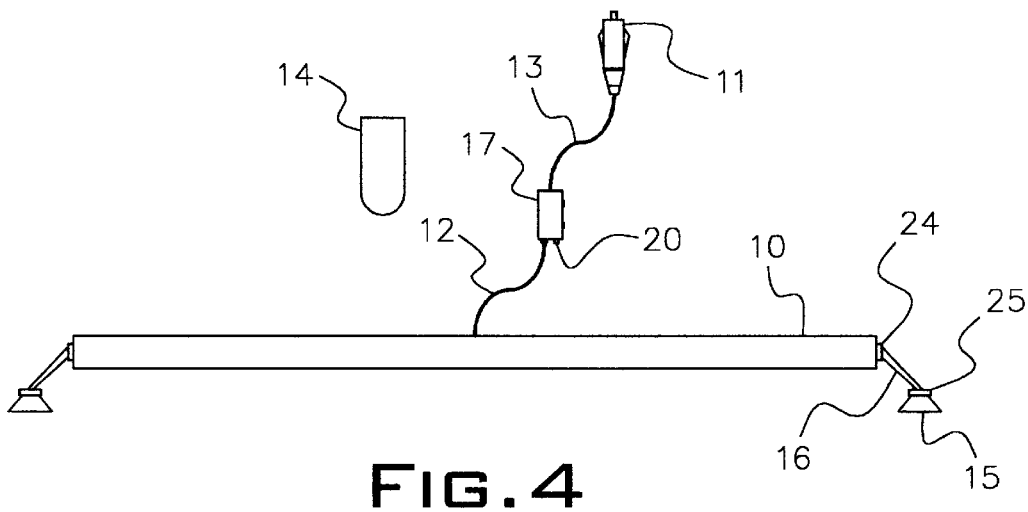
FIG. 4 is a bottom plan view of the emergency auto visual communication system of FIG. 1.
Figure 5:
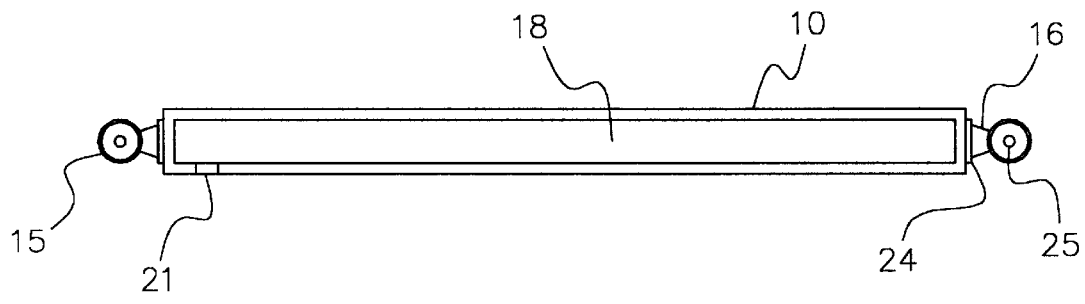
FIG. 5 is a front elevational view or the emergency auto visual communication system of FIG. 1.
Figure 6:
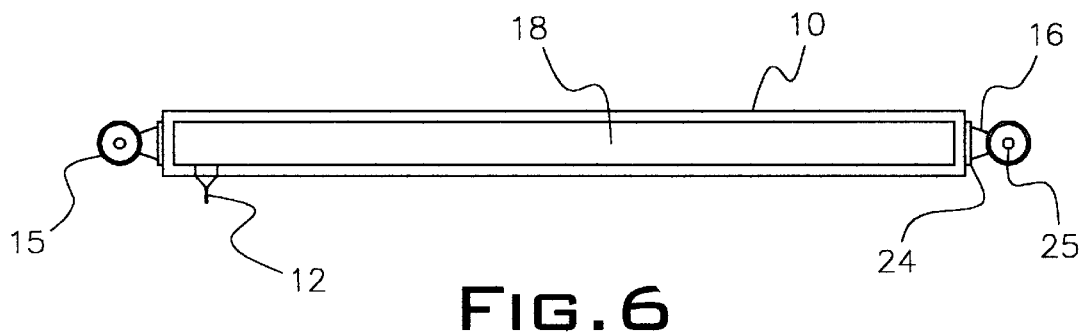
FIG. 6 is a rear elevational view of the emergency auto visual communication system as shown in FIG. 1.
Figure 7:
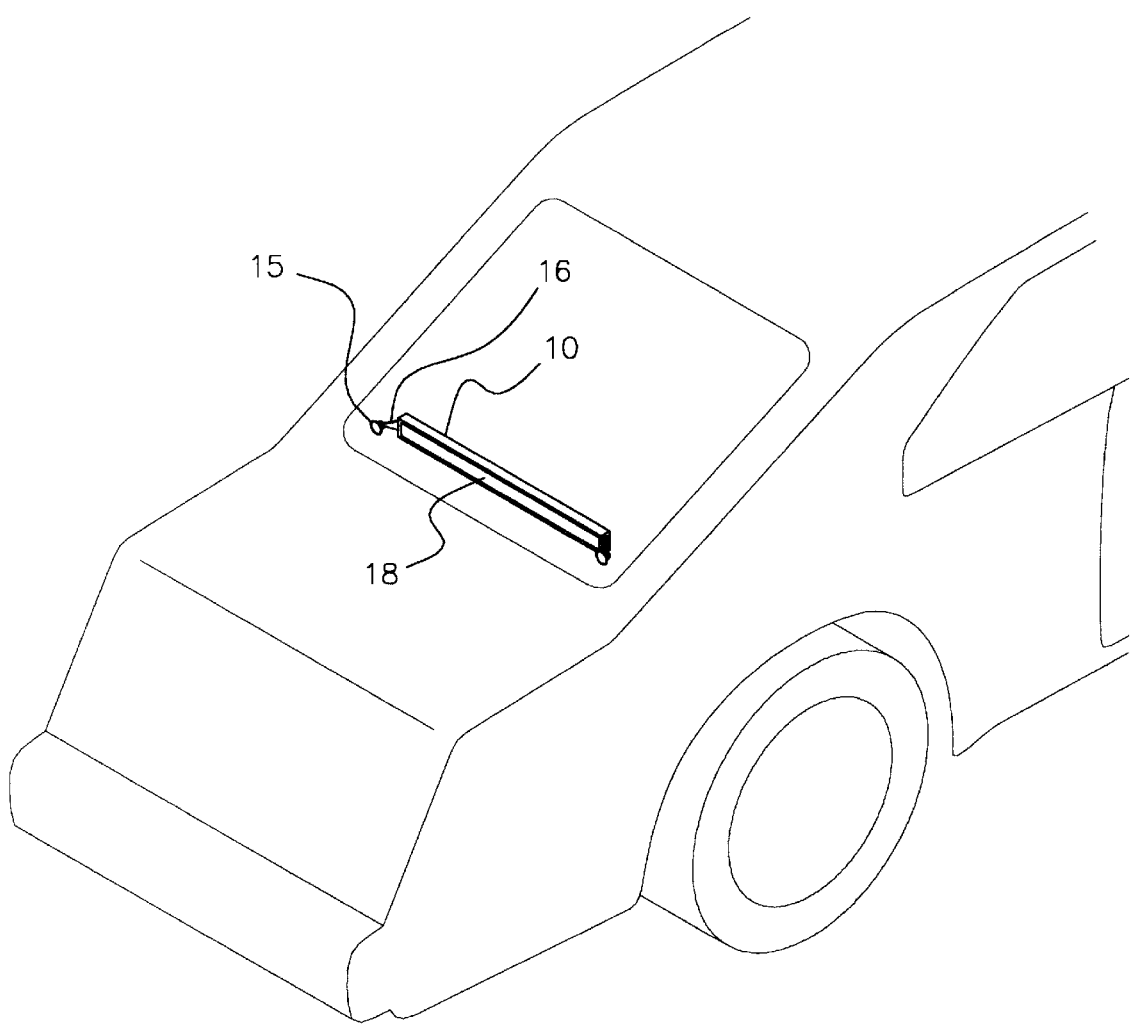
FIG. 7 is a top plan perspective view of the emergency auto visual communication system installed in a vehicle according to the invention.
Figure 8:
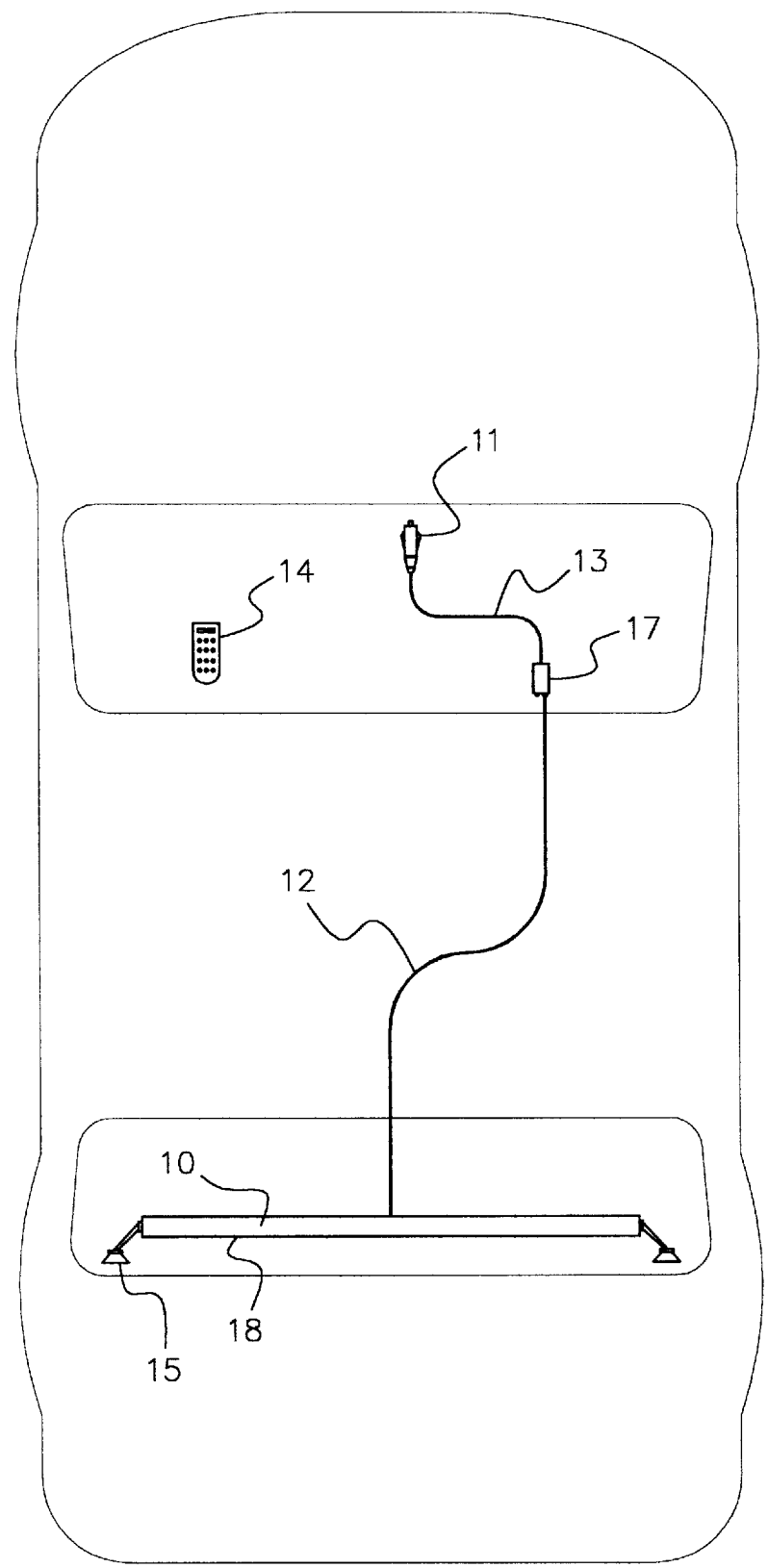
FIG. 8 is a rear perspective view of the emergency auto visual communication system installed in a vehicle according to the invention.
Figure 9:
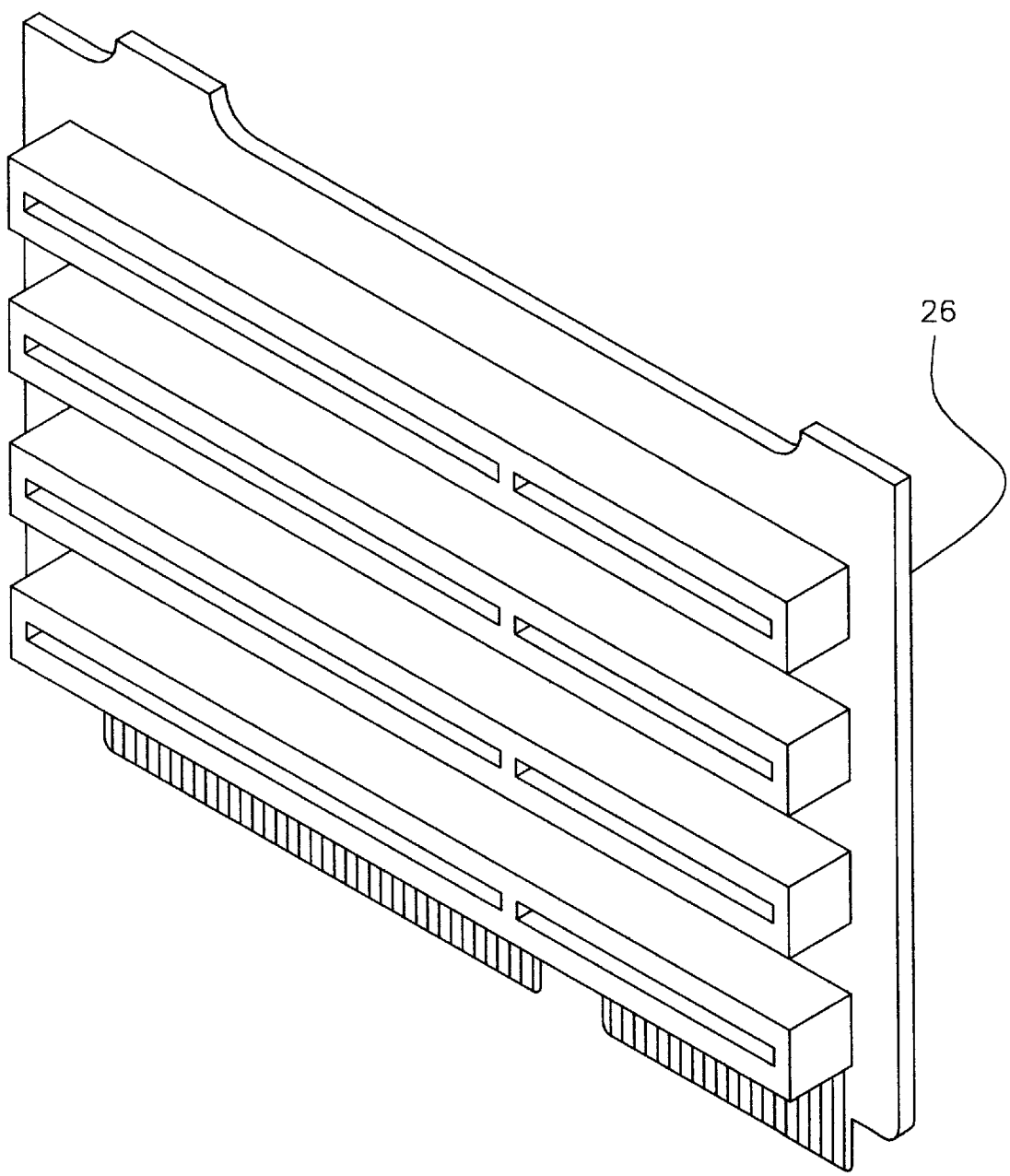
FIG. 9 is a top plan view of the memory board contained within the keypad as shown in FIG. 1.

Referring now to the drawings and more particularly to FIG. 1, there is shown an emergency auto visual communication system in accordance with a presently preferred embodiment of the present invention. The emergency auto visual communication FIG. 1 system includes a rigid case 10 to which contains the luminated electronic display 18 message board that can be attached to the rear window of a vehicle by the use of the suction cups 15. The keypad 19 contains the memory board (storage location for data) see FIG. 9.

The case 10 has two bracket mounts 24 which are located on the side of the case 10. To the bracket mounts 24, brackets 16 can be bolted. On the brackets 16 suction cups 15 can be attached via the suction cup mount 25. The suctions cups 15 can be attached to any smooth surface through which the luminated electronic display 18 message board can be seen.

In the back of the case 10 a wire 12 connecting the power converter 17 to the case 10 carries AC alternating electric current from the power converter 17 to the case 10 which holds the luminated electronic display 18.

The outer case of the power converter 17 which converts DC (direct current) power (automotive) to AC (alternating current) is made of a rigid electrically neutral material. A power switch 20 is located on the front of the power converter 17 that enables the user to turn the emergency auto visual communication FIG. 1 system on or off. The power converter 17 has mounts 22 on both side of the device to allow the user to mount the power converter 17 in a convenient place in the vehicle. The wire 13 attached to the power converter 17 carries DC direct electric current from the cigarette lighter adaptor 11 to the power converter 17. The cigarette lighter plug 11 is made of a rigid material and is sized to fit in any vehicle's cigarette lighter socket. The cigarette lighter plug 11 may have a self contained power converter that can convert the DC direct electrical current coming from the cigarette lighter socket to AC alternating current. The computer controller 14 with keypad 19 can be directly connected by wire to the case 10 controlling the luminated electronic display 18 message board or operate as a wireless remote control.

In carrying out the principles of the present invention in accordance with a preferred embodiment thereof, an illuminated electronic display message board designed to be mounted on any surface of the automobile preferably a window enabling the user to display multiple messages in response to energization from AC, DC, or batteries by means of a computer with a keypad that operates remotely from the attached devices. This keypad is capable of transmitting alpha or numeric information into memory or directly to the mounted display board from a remote location. The user of the keypad accesses the keypad data communication ability by directly pressing the buttons on the keypad that correspond to the message the user wants to send. An example of how to communicate a message "help" to the display board or to memory is for the user to press the keys on the keypad "h" then "e" then "1" then "help" then press enter to send the message to the display board, or press "h" then "e" then "1" then "p" then press memory to send the message to memory. The device is turned on by the power switch on the keypad, power converter (if installed), or power switch on the message board.

From the foregoing, it should be evident that herein has been described a new and improved emergency auto visual communication system that will enhance safety for any individuals who travel the nation's highways and roads. As noted, the invention further provides a unique way of communicating from vehicle to vehicle, or vehicle to passer by in a emergency threatening situation.

Although the invention has been described in detail with respect to presently preferred embodiments of the invention, it should be understood that the invention may be practiced using similar functioning but different elements, under the scope of the appended claims.

What is claimed is:

1. An emergency auto visual communication system for advisement from vehicle to observer that precludes a requirement for braking, comprising:
   a direct current (DC) to alternating current (AC) power converter that is either inserted into the vehicle's cigarette lighter socket or wired directly to the battery of the vehicle at one end;
   wherein said DC/AC power converter is electrically connected to an illuminated electronic display (LED) at other end;

wherein said DC/AC power converter comprises an attachment means for mounting said converter at any places in the interior of the vehicle;

a remote control comprises a computer with either a keyboard or keypad that controls, communicates and send messages to said display (LED) wirelessly; wherein said messages are alpha-numeric and graphic;

wherein a user can enter a new message via the keypad or keyboard and send it to said display (LED); wherein said user is able to change an entered initial message, and immediately send said new message or said changed entered initial message to said display to be displayed;

a plurality multiple set of messages can be stored in said computer for either randomly or selectively displaying on said display (LED) by said user, wherein each set of message comprises a plurality of messages;

an elongated case encloses said display (LED); wherein said case has two bracket mounts located on both left and right side of the case, respectively; each bracket mount is bolted with a respective bracket; on each bracket, a respective suction cup is attached to a respective bracket via a respective suction cup mount;

wherein said display (LED) attaches to either an interior rear, front or side window of the vehicle via said suction cups, allowing said messages to be displayed on said display (LED) that can be seen through the windows at any time in a day;

wherein said communication system enables said user to communicate with said observer outside the vehicle without leaving the confines of the vehicle.

* * * * *